United States Patent
Moosavi et al.

(10) Patent No.: US 8,831,509 B2
(45) Date of Patent: Sep. 9, 2014

(54) MOBILE DEVICE HAVING ENHANCED IN-HOLSTER POWER SAVING FEATURES USING NFC AND RELATED METHODS

(75) Inventors: Vahid Moosavi, Kitchener (CA); Scott Douglas Rose, Waterloo (CA); Vytas Kezys, Hamilton (CA)

(73) Assignee: BlackBerry Limited, Waterloo, Ontario (CA)

( * ) Notice: Subject to any disclaimer, the term of this patent is extended or adjusted under 35 U.S.C. 154(b) by 207 days.

(21) Appl. No.: 13/017,473

(22) Filed: Jan. 31, 2011

(65) Prior Publication Data
US 2012/0196530 A1 Aug. 2, 2012

(51) Int. Cl.
*H04B 5/00* (2006.01)
*H04W 52/02* (2009.01)
*H04M 1/04* (2006.01)

(52) U.S. Cl.
CPC ...... *H04W 52/0251* (2013.01); *H04M 2250/04* (2013.01); *Y02B 60/50* (2013.01); *H04M 1/04* (2013.01)
USPC ........................................ 455/41.1; 455/41.2

(58) Field of Classification Search
None
See application file for complete search history.

(56) References Cited

U.S. PATENT DOCUMENTS

| | | | |
|---|---|---|---|
| 2004/0180649 A1 | 9/2004 | Vogel et al. | 455/418 |
| 2004/0256460 A1* | 12/2004 | Charrat | 235/451 |
| 2006/0022822 A1 | 2/2006 | Wong et al. | 340/568.1 |
| 2006/0287004 A1 | 12/2006 | Fuqua | 455/558 |
| 2008/0034217 A1 | 2/2008 | McQuaide | 713/186 |
| 2008/0191892 A1* | 8/2008 | Kirkup et al. | 340/686.6 |
| 2009/0109032 A1* | 4/2009 | Braun et al. | 340/572.1 |
| 2010/0164479 A1* | 7/2010 | Alameh et al. | 324/115 |

FOREIGN PATENT DOCUMENTS

EP 1959332 8/2008 ............... G06F 1/32

OTHER PUBLICATIONS

Melexis, MLX90132 13.56MHz RFID/NFC Reader IC Product Review, Mar. 2010, Rev. 005, pp. 1-12.*
U.S. Appl. No. 12/977,245, filed Dec. 23, 2013, Moosavi et al.

* cited by examiner

*Primary Examiner* — Nay A Maung
*Assistant Examiner* — Alejandro Rivero
(74) *Attorney, Agent, or Firm* — Allen, Dyer, Doppelt, Milbrath & Gilchrist, P.A. Attorneys at Law

(57) ABSTRACT

A communications system may include a holder, a first near-field communication (NFC) device carried by the holder, and a mobile device. The mobile device may include a housing configured to be removably positioned within the holder, a second NFC device carried by the housing and configured to communicate with the first NFC device via NFC communications, and a controller carried by the housing and coupled to the second NFC device. The controller may be configured to operate the second NFC device to scan for the first NFC device in a first mode when the housing is removed from the holder, and operate the second NFC device in a second mode based upon communication with the first NFC device when the housing is positioned within the holder, where the second mode has a lower power consumption level associated therewith than the first mode.

20 Claims, 5 Drawing Sheets

MOBILE DEVICE HAVING ENHANCED IN-HOLSTER POWER SAVING FEATURES USING NFC AND RELATED METHODS

TECHNICAL FIELD

This application relates to the field of communications, and more particularly, to electronic devices and related methods that use near-field communication (NFC).

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the Internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. These short-range communications include payment and ticketing, electronic keys, identification, device set-up service and similar information sharing. This short-range high frequency wireless communications technology exchanges data between devices over a short distance, such as only a few centimeters.

DETAILED DESCRIPTION

Figure 1:
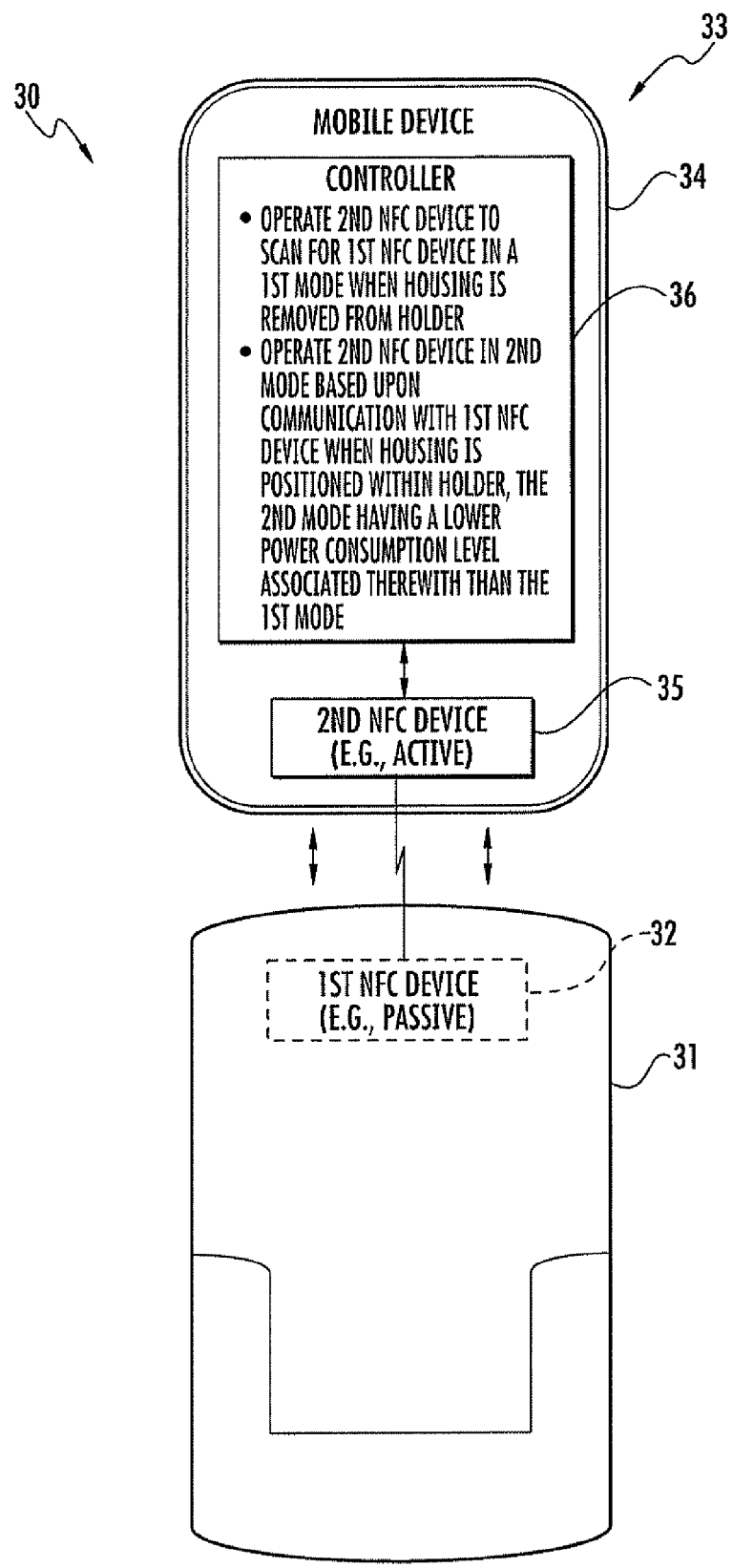
FIG. 1 is a schematic block diagram of a communications system in accordance with one example aspect.

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Generally speaking, a communications system is disclosed herein which may include a mobile device holder, a first near-field communication (NFC) device carried by the mobile device holder, and a mobile device. The mobile device may include a portable housing configured to be removably positioned within the mobile device holder, a second NFC device carried by the portable housing and configured to communicate with the first NFC device via NFC communications, and a controller carried by the portable housing and coupled to the second NFC device. The controller may be configured to operate the second NFC device to scan for the first NFC device in a first mode when the portable housing is removed from the mobile device holder, and operate the second NFC device in a second mode based upon communication with the first NFC device when the portable housing is positioned within the mobile device holder, where the second mode has a lower power consumption level associated therewith than the first mode. As such, the system may advantageously provide enhanced mobile device holder detection and power consumption features.

More particularly, the second NFC device may be configured to determine a magnetic field change while in the second mode. As such, the controller may be further configured to determine when the portable housing is removed from the mobile device holder based upon the determined magnetic field change. By way of example, the first NFC device may comprise a passive NFC device. Also by way of example, the first mode may comprise a low power card emulation mode, and the second NFC device may draw a current in a range of 4-5 mA when operated in the first mode. By way of comparison, the second mode may comprise a low power tag detection mode, and the second NFC device may draw a current in a range of 15-150 µA when operated in the second mode, for example.

The mobile device may further include at least one input device carried by the portable housing and coupled to the controller that is switchable between active and inactive states. Accordingly, the controller may be further configured to switch the at least one input device to the active state when the second NFC device is in the first mode, and to the inactive state when the second NFC device is in the second mode. Additionally, the mobile device may further include a wireless transceiver coupled to the controller and configured to communicate via a wireless communications network.

A related mobile device, such as the one described briefly above, and a related method for operating such a mobile device are also provided. The method may include operating the second NFC device to scan for the first NFC device in a first mode when the portable housing is removed from the mobile device holder, and operating the second NFC device in a second mode based upon communication with the first NFC device when the portable housing is positioned within the mobile device holder, wherein the second mode has a lower power consumption level associated therewith than the first mode.

A related non-transitory computer-readable medium is for a mobile device, such as the one described briefly above. The computer-readable medium may have computer-executable instructions for causing the mobile device to perform steps including operating the second NFC device to scan for the first NFC device in a first mode when the portable housing is removed from the mobile device holder, and operating the second NFC device in a second mode based upon communication with the first NFC device when the portable housing is positioned within the mobile device holder. Here again, the second mode may have a lower power consumption level associated therewith than the first mode.

Referring initially to FIG. 1, a communications system 30 is first described. The system 30 illustratively includes a holder 31 for a mobile device 33, and a first near-field communication (NFC) device 32 carried by the mobile device holder 31. The mobile device 33 illustratively includes a portable housing 34 configured to be removably positioned within or carried by the mobile device holder 31, as indicated by the arrows in FIG. 1. By way of example, the mobile device 33 may be a portable or mobile telephone or smartphone, and the mobile device holder 31 may be configured for attachment (via a clip, etc.) to a user's belt or clothing to provide a convenient way to carry the phone, such as a holster. In another example implementation, the mobile device holder 31 may be configured for use within an automobile (e.g., on a dashboard, air conditioner vent, etc.) to secure the mobile device 33 while driving or riding, on a desk or counter top (e.g., in a cradle configuration), etc. However, it should be noted that the mobile device holder 31 may be otherwise carried or mounted, and may be used with other types of mobile devices such as portable or personal media players (e.g., MP3 players, video players, etc.), remote controls (e.g., television or stereo remotes, etc.), portable gaming devices, etc., for example.

The mobile device 33 further illustratively includes a second NFC circuit 35 carried by the portable housing 34 and configured to communicate with the first NFC circuit 32 via NFC communications, and a controller 36 carried by the portable housing and coupled to the second NFC circuit 35. By way of example, the controller 36 may be implemented using a combination of hardware (e.g., microprocessor, etc.) and non-transitory computer-readable medium components, as will be discussed further below.

NFC is a short-range wireless communications technology in which NFC-enabled devices are "swiped," "bumped" or otherwise moved in close proximity to communicate. In one non-limiting example implementation, NFC may operate at 13.56 MHz and with an effective range of about 10 cm, but other suitable versions of near-field communication which may have different operating frequencies, effective ranges, etc., for example, may also be used. By way of example, the first NFC circuit 32 may be operable as a passive NFC tag, and the second NFC circuit 35 may be operable as an active NFC reader, for example.

Figure 3:
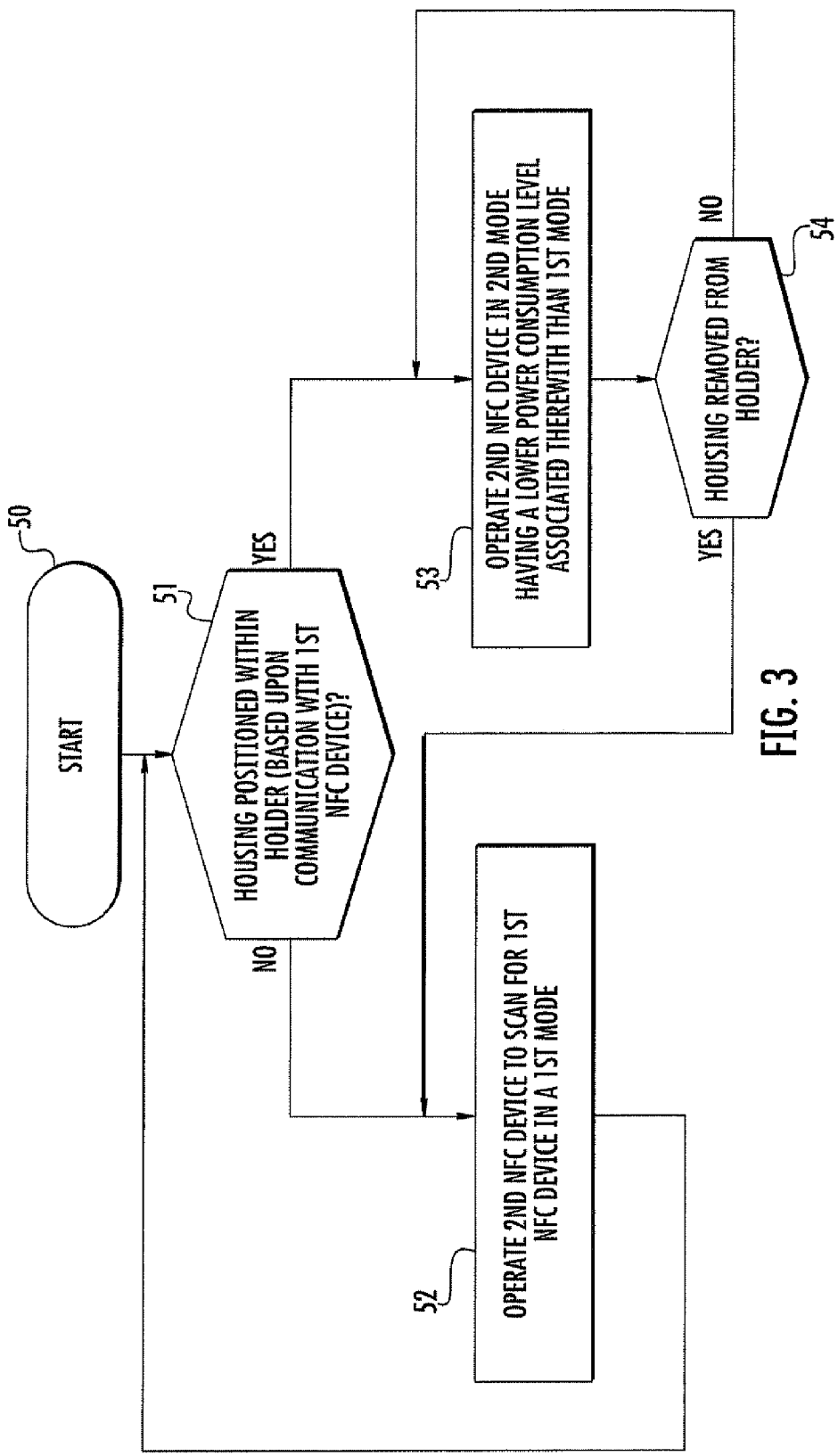
FIGS. 3 and 4 are flow diagrams illustrating method aspects associated with the system of FIG. 1 and mobile device of FIG. 2.

Turning additionally to FIG. 3, beginning at Block 50, the controller 36 is configured to operate the second NFC circuit 35 to scan for the first NFC circuit 32 in a first mode when the portable housing 34 is removed from or otherwise not in proximity with the mobile device holder 31, at Blocks 51-52. By way of example, the first NFC circuit 32 may have a standard or generic identification associated therewith which generally identifies it as a mobile device holder (similar to a UPC code). Alternatively, the first NFC circuit 32 may have a unique identification associated therewith that is stored by the controller 36 and recognized as a respective paired holder for the mobile device 33. Moreover, the controller 36 is further configured to operate the second NFC circuit 35 in a second mode based upon communication with the first NFC circuit 32 when the portable housing 34 is positioned within the mobile device holder 31, at Block 53, and returns to the first mode upon being removed from the mobile device holder 31, at Block 54. In particular, the second mode has a lower power consumption level associated therewith than the first mode.

Figure 2:
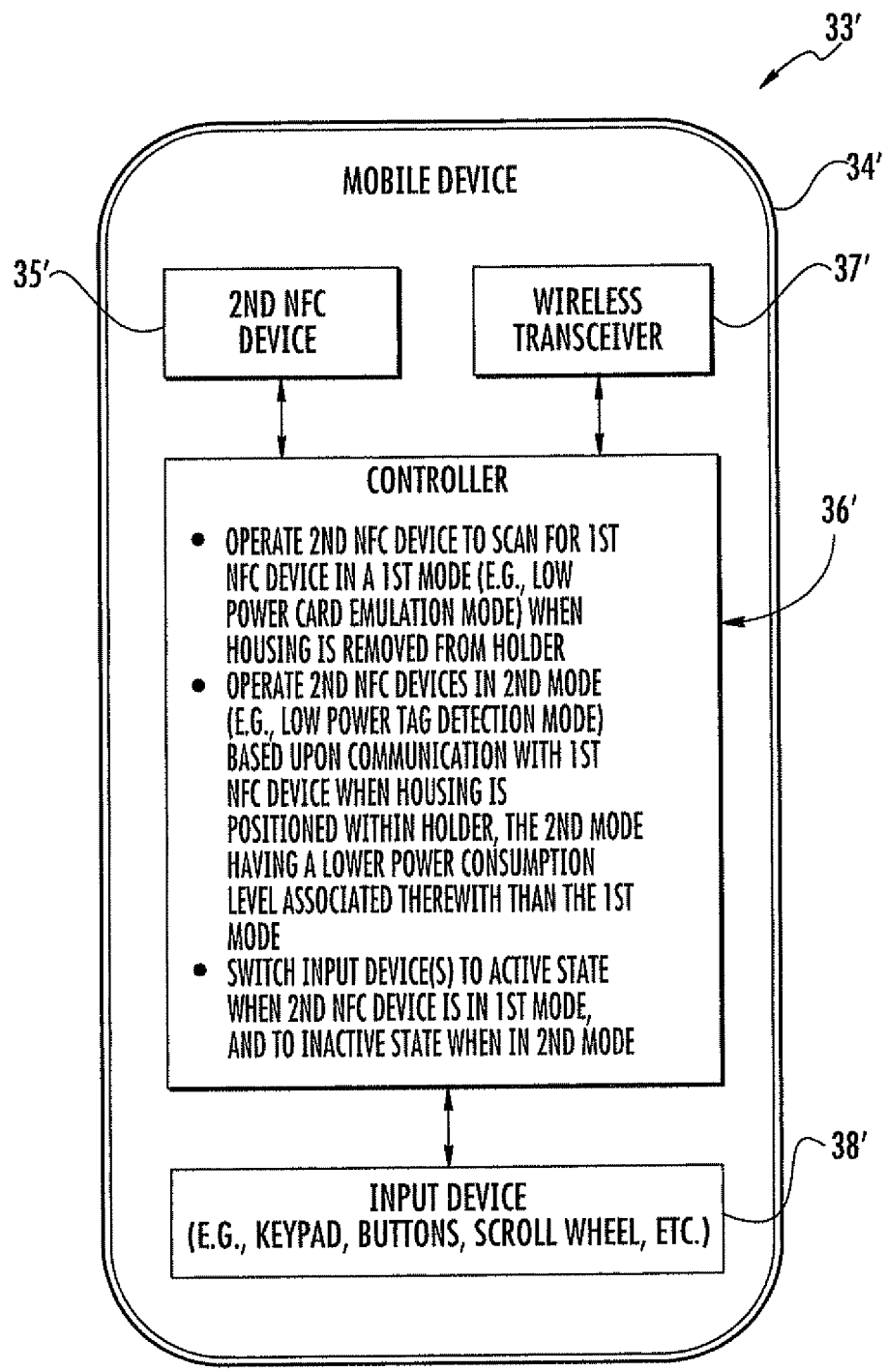
FIG. 2 is a schematic block diagram of an alternative embodiment of the mobile device of the system illustrated in FIG. 1.
Figure 4:
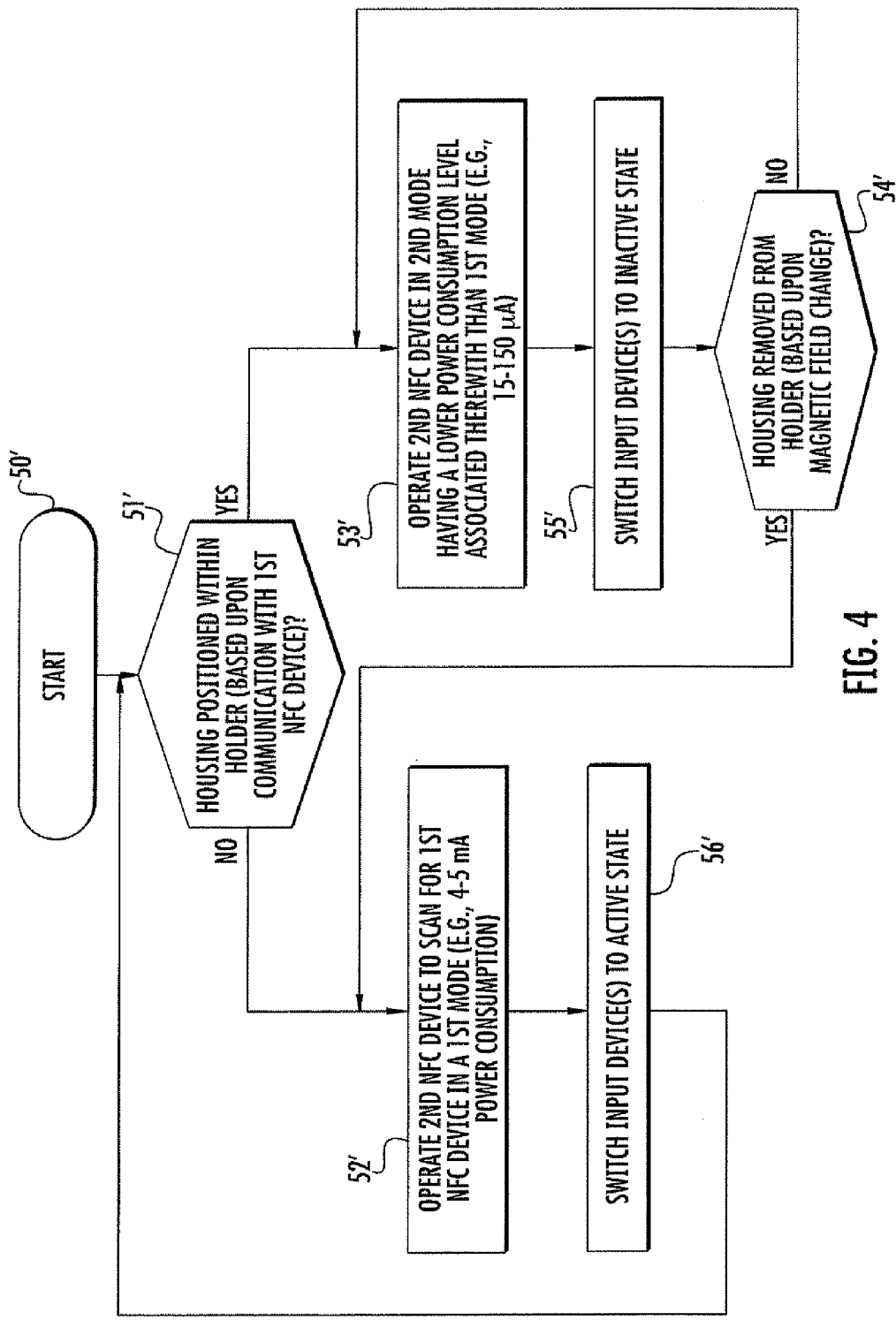

Referring more particularly to FIGS. 2 and 4, the example mobile device 33' further illustratively includes a wireless transceiver 37' (e.g., cellular, wireless local area network (WLAN), WiMAX, etc.), and one or more input devices 38' carried by the portable housing 34' and coupled to the controller 36'. By way of example, the input device(s) 38' may comprise one or more input keys (e.g., a keypad or keyboard), a track pad, scroll wheel, track ball, convenience keys or buttons, touch screen, etc.

In an example implementation, the first mode in which the second NFC circuit 35' operates may comprise an NFC low power card emulation mode. This mode is "low power" as compared to a continuous active NFC state, wherein the second NFC circuit 35' would continuously generate electromagnetic carrier field pulses to detect the presence of another NFC circuit, such as the passive first NFC circuit 32. However, in the low power card emulation mode, the second NFC circuit 35' may still cycle to an active NFC state at a given frequency, and therefore may typically have a power consumption (e.g., current draw) on the order of a few milliamps of current per second (e.g., approximately 4-5 mA per second). While this power consumption might be acceptable when the mobile device 33' is in use, it may be undesirably high when the mobile device 33' is within the mobile device holder 31, since the likelihood of scanning for other NFC devices would be low in such instances.

The second mode in which the second NFC device 35' operates may comprise an NFC low power tag detection mode. By way of comparison, in an NFC low power tag detection mode, the second NFC device 35' may advantageously send out electromagnetic carrier field pulses, but of a relatively shorter duration than in the low power card emulation mode, to detect a magnetic field change. That is, rather than continuing to engage in near-field communication with the first NFC device 32, which would require longer duration active mode pulses, the second NFC device 35' instead emits the shorter pulses for the purpose of determining when it has been moved with respect to one or more conductors (e.g., metals) in its vicinity. That is, the metal, etc. present in the first NFC device 32, mobile device holder 31, etc., will result in a given magnetic field measurement or reading by the second NFC device 35' when it emits the short pulses. Yet, when the position of the second NFC device 35' is moved relative to the surrounding conductor(s), then the given measurement will change. So, for example, if this measurement changes beyond a threshold level, then the controller 36' will determine that the mobile device 30' has been removed from the mobile device holder 31.

In the second mode (e.g., low power tag detection mode), the second NFC device 35' may have a significantly lower power consumption than when operating in the first mode. For example, in a low power tag detection mode, the second NFC device 35' may have a power consumption (e.g., current draw) in the microamp per second range (e.g., approximately 15-150 µA).

While the second NFC device 35' is in the second operating mode (i.e., meaning the portable housing 34' is in the mobile device holder 31), it may also be desirable to switch the input device 38' to an inactive state to provide further power savings (e.g., disable keypad, etc.), or to prevent an inadvertent input while in the holder, at Block 55'. When the controller 36' determines that the portable housing 34' has been removed from the mobile device holder 31 (Block 54'), as discussed above, then the second NFC device 35' is switched back to the first operating mode (e.g., low power card emulation mode), at Block 52', and the input device 38' may also be switched back to an active state, at Block 56' (e.g., enable keypad, etc.). Output devices (e.g., display, etc.) may similarly be selectively enabled or disabled during active or inactive operating modes, in some embodiments.

A related non-transitory computer-readable medium is also provided for the mobile device 33. The computer-readable medium may have computer-executable instructions for causing the mobile device 33 to perform steps including operating the second NFC device 35 to scan for the first NFC device 32 in a first mode when the portable housing 34 is removed from the mobile device holder 31, and operating the second NFC device in a second mode based upon communication with the first NFC device when the portable housing 34 is positioned within the mobile device holder 31. The second mode may have a lower power consumption level associated therewith than the first mode, as discussed further above.

Example components of a mobile wireless communications device 1000 that may be used in accordance with the above-described embodiments are further described below with reference to FIG. 5. The device 1000 illustratively includes a housing 1200, a keypad or keyboard 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 5:
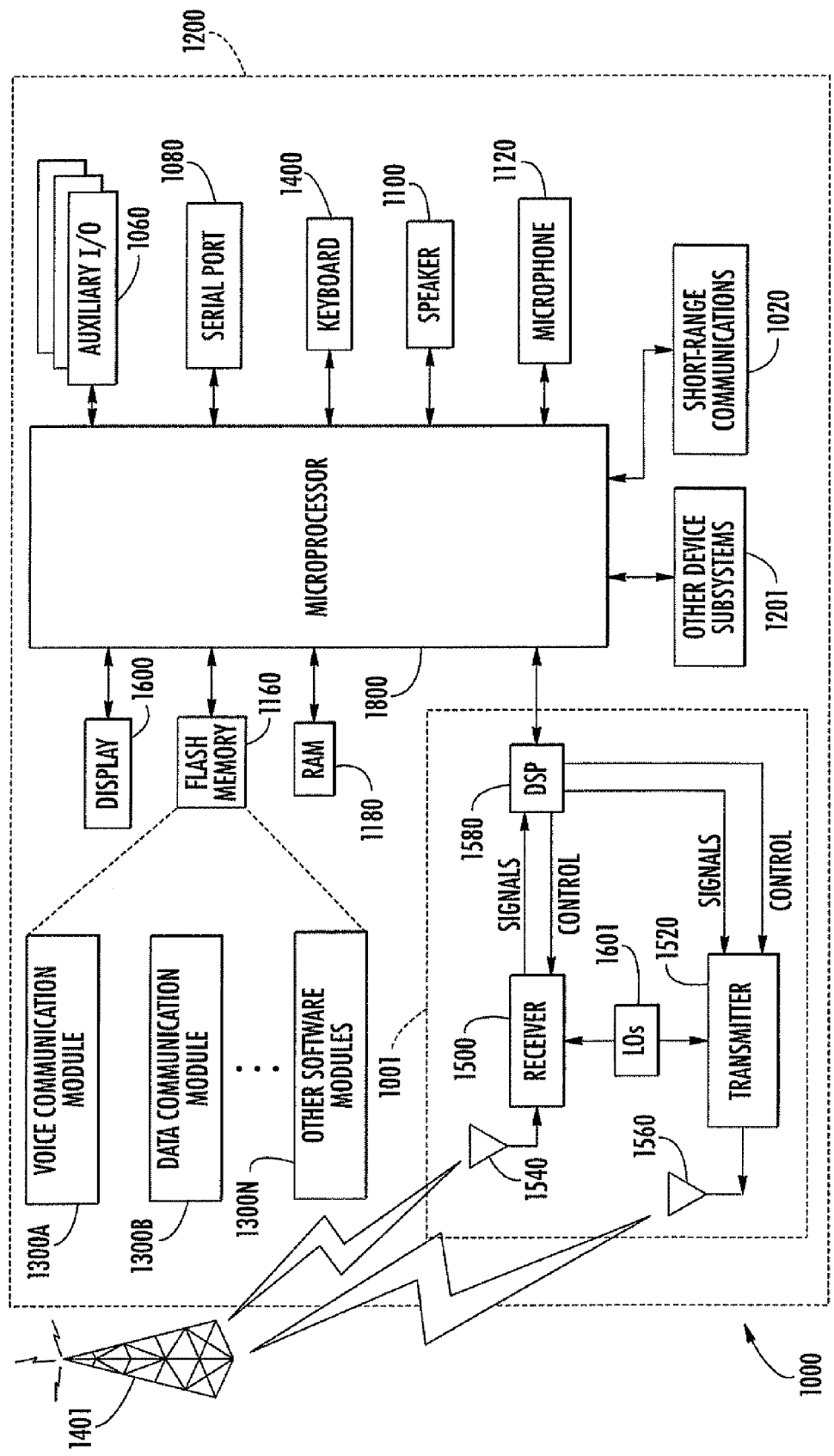
FIG. 5 is a schematic diagram illustrating example components that may be used with the mobile devices of FIG. 1 or 2.

In addition to the processing device 1800, other parts of the mobile device 1000 are shown schematically in FIG. 5. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. For example, a power mode switching application may be used for controlling switching between different power consumption modes. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, NFC or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A communications system comprising:
   a holder;
   a first near-field communication (NFC) device carried by said holder; and
   a mobile device comprising
      a housing configured to be removably positioned within said holder,
      a second NFC device carried by said housing and configured to communicate with said first NFC device via NFC communications, and
      a controller carried by said housing and coupled to said second NFC device and configured to
         operate said second NFC device to scan for said first NFC device in a first mode using electromagnetic (EM) carrier field pulses having a pulse width of a first duration when said housing is removed from said holder, and
         operate said second NFC device in a second mode using EM carrier field pulses having a pulse width of a second duration shorter than the first duration based upon communication with said first NFC device when said housing is positioned within said holder, the second mode having a lower power consumption level associated therewith than the first mode, wherein said second NFC device draws a current in a range of 4-5 mA when operated in the first mode and a range of 15-150 µA when operated in the second mode.

2. The communications system of claim 1 wherein said second NFC device is configured to determine a magnetic field change while in the second mode; and wherein said controller is further configured to determine when said housing is removed from said holder based upon the determined magnetic field change.

3. The communications system of claim 1 wherein said first NFC device comprises a passive NFC device.

4. The communications system of claim 1 wherein the first mode comprises a low power card emulation mode.

5. The communications system of claim 1 wherein the second mode comprises a low power tag detection mode.

6. The communications system of claim 1 wherein said mobile device further comprises at least one input device carried by said housing and coupled to said controller and switchable between active and inactive states; and wherein said controller is further configured to switch said at least one input device to the active state when said second NFC device is in the first mode, and to the inactive state when said second NFC device is in the second mode.

7. The communications system of claim 1 wherein said mobile device further comprises a wireless transceiver coupled to said controller.

8. A mobile device for use with a holder and a first near-field communication (NFC) device carried by the holder, the mobile device comprising:
   a housing configured to be removably positioned within said holder;
   a second NFC device carried by said housing and configured to communicate with said first NFC device via NFC communications; and
   a controller carried by said housing and coupled to said second NFC device and configured to
      operate said second NFC device to scan for the first NFC device in a first mode using electromagnetic (EM) carrier field pulses having a pulse width of a first duration when said housing is removed from the holder, and
      operate said second NFC device in a second mode using EM carrier field pulses having a pulse width of a second duration shorter than the first duration based upon communication with the first NFC device when said housing is positioned within the holder, the second mode having a lower power consumption level associated therewith than the first mode, wherein said second NFC device draws a current in a range of 4-5 mA when operated in the first mode and a range of 15-150 µA when operated in the second mode.

9. The mobile device of claim 8 wherein said second NFC device is configured to determine a magnetic field change while in the second mode; and wherein said controller is further configured to determine when said housing is removed from the holder based upon the determined magnetic field change.

10. The mobile device of claim 8 wherein the first mode comprises a low power card emulation mode, and wherein the second mode comprises a low power tag detection mode.

11. The mobile device of claim 8 further comprising at least one input device carried by said housing and coupled to said controller and switchable between active and inactive states; and wherein said controller is further configured to switch said at least one input device to the active state when said second NFC device is in the first mode, and to the inactive state when said second NFC device is in the second mode.

12. The mobile device of claim 8 further comprising a wireless transceiver coupled to said controller.

13. A method for operating a mobile device comprising a housing configured to be removably positioned within a holder carrying a first near-field communication (NFC) device, and a second NFC device carried by the housing and configured to communicate with the first NFC device via NFC communications, the method comprising:
   operating the second NFC device to scan for the first NFC device in a first mode using electromagnetic (EM) carrier field pulses having a pulse width of a first duration when the housing is removed from the holder; and
   operating the second NEC device in a second mode using EM carrier field pulses having a pulse width of a second duration shorter than the first duration based upon communication with the first NEC device when the housing is positioned within the holder, the second mode having a lower power consumption level associated therewith than the first mode, wherein said second NFC device draws a current in a range of 4-5 mA when operated in the first mode and a range of 15-150 µA when operated in the second mode.

14. The method of claim 13 wherein the second NFC device is configured to determine a magnetic field change while in the second mode; and further comprising determining when the housing is removed from the holder based upon the determined magnetic field change.

15. The method of claim 14 wherein the first mode comprises a low power card emulation mode, and wherein the second mode comprises a low power tag detection mode.

16. The method of claim 14 wherein the mobile device further comprises at least one input device carried by the housing and coupled to the controller and switchable between active and inactive states; and further comprising switching the at least one input device to the active state when the second NFC device is in the first mode, and to the inactive state when the second NFC device is in the second mode.

17. A non-transitory computer-readable medium for a mobile device comprising a housing configured to be removably positioned within a holder carrying a first near-field communication (NFC) device, and a second NFC device carried by the housing and configured to communicate with the first NFC device via NFC communications, the computer-readable medium having computer-executable instructions for causing the mobile device to perform steps comprising:

operating the second NFC device to scan for the first NFC device in a first mode using electromagnetic (EM) carrier field pulses having a pulse width of a first duration when the housing is removed from the holder; and operating the second NFC device in a second mode using EM carrier field pulses having a pulse width of a second duration shorter than the first duration based upon communication with the first NFC device when the housing is positioned within the holder, the second mode having a lower power consumption level associated therewith than the first mode, wherein said second NFC device draws a current in a range of 4-5 mA when operated in the first mode and a range of 15-150 µA when operated in the second mode.

18. The non-transitory computer-readable medium of claim 17 wherein the second NFC device is configured to determine a magnetic field change while in the second mode; and further having computer-executable instructions for performing a step of determining when the is removed from the mobile device holder based upon the determined magnetic field change.

19. The non-transitory computer-readable medium of claim 18 wherein the first mode comprises a low power card emulation mode, and wherein the second mode comprises a low power tag detection mode.

20. The non-transitory computer-readable medium of claim 18 wherein the mobile device further comprises at least one input device carried by the housing and coupled to the controller and switchable between active and inactive states; and further having computer-executable instructions for performing steps comprising switching the at least one input device to the active state when the second NFC device is in the first mode, and to the inactive state when the second NFC device is in the second mode.

* * * * *